United States Patent
Ichiryu et al.

(10) Patent No.: US 11,084,334 B2
(45) Date of Patent: Aug. 10, 2021

(54) TIRE FOR A MOTORCYCLE

(71) Applicant: Sumitomo Rubber Industries, Ltd., Kobe (JP)

(72) Inventors: Yutaka Ichiryu, Kobe (JP); Naoki Yukawa, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 625 days.

(21) Appl. No.: 15/948,424

(22) Filed: Apr. 9, 2018

(65) Prior Publication Data
US 2018/0312016 A1 Nov. 1, 2018

(30) Foreign Application Priority Data
May 1, 2017 (JP) .............. JP2017-091160

(51) Int. Cl.
| | |
|---|---|
| *B60C 19/12* | (2006.01) |
| *B60C 5/14* | (2006.01) |
| *B60C 3/04* | (2006.01) |
| *B60C 11/00* | (2006.01) |

(52) U.S. Cl.
CPC .......... *B60C 19/122* (2013.01); *B60C 3/04* (2013.01); *B60C 5/14* (2013.01); *B60C 11/0083* (2013.01); *B60C 2200/10* (2013.01)

(58) Field of Classification Search
CPC ...... B60C 3/04; B60C 19/122; B60C 2200/10
See application file for complete search history.

(56) References Cited

U.S. PATENT DOCUMENTS

| | | | |
|---|---|---|---|
| 6,626,218 B1 | 9/2003 | Ochiai et al. | |
| 2010/0206451 A1* | 8/2010 | Ishiyama | B60C 15/0018 |
| | | | 152/531 |
| 2017/0297281 A1 | 10/2017 | Yukawa et al. | |
| 2020/0061945 A1* | 2/2020 | Randall | B60C 5/14 |

FOREIGN PATENT DOCUMENTS

| | | | |
|---|---|---|---|
| EP | 0879715 A1 | 11/1998 | |
| EP | 0893236 A1 | 1/1999 | |
| EP | 0940270 A2 | 9/1999 | |
| JP | 11-320697 A | 11/1999 | |
| JP | 2015098201 | * | 5/2015 |
| JP | 2016-078440 A | 5/2016 | |

OTHER PUBLICATIONS

Machine translation of JPH11320697A (Year: 1999).*
Extended European Search Report, dated Sep. 17, 2018, for European Application No. 18159532.3.

* cited by examiner

*Primary Examiner* — Timothy Kennedy
*Assistant Examiner* — Alexander A Wang
(74) *Attorney, Agent, or Firm* — Birch, Stewart, Kolasch & Birch, LLP

(57) ABSTRACT

A tire 1 for a motorcycle comprises a tread portion 2 provided on an inner surface 2Si thereof with a sealant layer 11 for preventing puncture. In each half of a cross-sectional view of the tire 1, when the tread portion 2 is virtually divided into a center region 2C, a middle region 2M, and a shoulder region 2S, a thickness tm of the sealant layer 11 in the middle region 2M is larger than a thickness tc of the sealant layer 11 in the center region 2C.

12 Claims, 2 Drawing Sheets

TIRE FOR A MOTORCYCLE

TECHNICAL FIELD

The present invention relates to a tire for a motorcycle provided with a sealant layer for preventing puncture on an inner surface of the tire.

BACKGROUND ART

As a pneumatic tire having a puncture preventing function, a so-called sealant tire having a sealant layer on the inner surface of the tire is known. In this sealant tire, a hole formed at the time of puncture is automatically closed with a sealant material (see, for example, Japanese unexamined Patent Application Publication No. 2016-078440 (Patent Literature 1)). Note that the sealant layer can be formed by, for example, applying the sealant material continuously extruded from a twin-screw kneading extruder onto the inner surface of a rotating tire in a close-contacting spiral shape.

In recent years, it has also been expected to provide a puncture preventing function to a tire for a motorcycle by using the sealant layer. However, as a result of research conducted by inventors of the present invention, it was found that when the sealant layer is provided on the inner surface of a tire for a motorcycle, rigidity balance changes due to influence of the sealant layer, therefore, steering stability is deteriorated in some cases. That is, in order to suppress the deterioration of the steering stability, new ideas of improvement are required.

SUMMARY OF THE INVENTION

The present invention was made in view of the above, and a primary object thereof is to provide a tire for a motorcycle capable of exerting a puncture prevention function by the sealant layer and suppressing the deterioration of the steering stability caused by the sealant layer.

In one aspect of the present invention, a tire for a motorcycle comprises a tread portion comprising an outer surface having a convex arc contour shape having a radius of curvature not more than 300 mm, wherein the tread portion is provided on an inner surface thereof with a sealant layer for preventing puncture, and in each half of a cross-sectional view of the tire, when the tread portion is virtually divided into a center region having a width we from a tire equator along the outer surface in a range of 35% to 45% of a tread developed half width TW between the tire equator and a tread edge, a shoulder region having a width Ws from the tread edge along the outer surface in a range of 15% to 25% of the tread developed half width TW, and a middle region between the center region and the shoulder region, a thickness tm of the sealant layer in the middle region is larger than a thickness tc of the sealant layer in the center region.

In another aspect of the invention, it is preferred that the thickness tm is smaller than 2.0 times a total average thickness T0 obtained by averaging an entire thickness of the sealant layer.

In another aspect of the invention, it is preferred that in each half of the cross-sectional view of the tire for a motorcycle, the contour shape of the tread portion consists of a first arc portion having a radius of curvature R1 with an arc center thereof on the tire equator and a second arc portion having a radius of curvature R2 and connected with the first arc portion at an intersection P, and the radius of curvature R1 is smaller than the radius of curvature R2.

In another aspect of the invention, it is preferred that the sealant layer in the middle region has a maximum thickness position at which the thickness tm is the maximum, and a distance along the outer surface between the intersection P and a reference line Y passing through the arc center of the first arc portion and the maximum thickness position is not more than 25% of the tread developed half width TW.

In another aspect of the invention, it is preferred that the radius of curvature R1 is not more than 150 mm.

In another aspect of the invention, it is preferred that the tread portion has a tread reinforcing cord layer disposed thereinside, and a developed half width BW of the tread reinforcing cord layer from the tire equator is in a range of from 0.6 to 0.9 times the tread developed half width TW.

In this specification, unless otherwise noted, dimensions and the like of various parts of the tire including a contour shape of an outer surface of the tread portion are specified in a 5%-pressure state in which the tire is mounted on a standard rim and inflated to 5% of a standard inner pressure.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO. The "standard inner pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

DESCRIPTION OF THE PREFERRED EMBODIMENT

Figure 1:
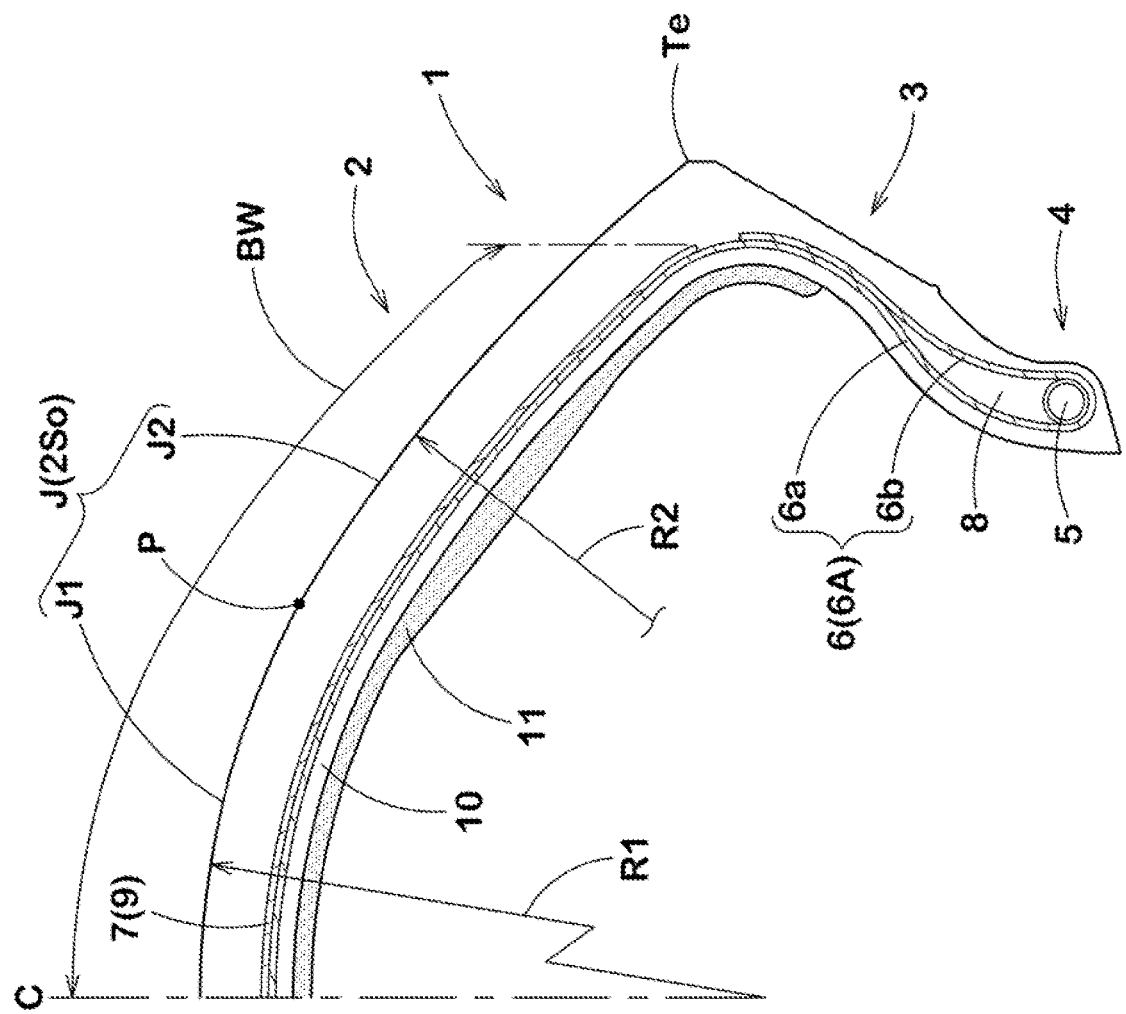
FIG. 1 is a cross-sectional view of a tire for a motorcycle as an embodiment of the present invention.

An embodiment of the present invention will now be described in detail. As shown in FIG. 1, a tire 1 for a motorcycle (hereinafter, may be simply referred to as "tire 1") in this embodiment comprises a tread portion 2, sidewall portions 3, bead cores 5 of bead portions 4, a carcass 6 extending between the bead cores 5 of the bead portions 4 through the sidewall portions 3 and the tread portion 2, and a tread reinforcing cord layer 7 disposed inside the tread portion 2 on an outer side in a tire radial direction of the carcass 6.

In each half of a cross-sectional view of the tire 1, an outer surface 2So of the tread portion 2 has a contour shape 3 extending between a tire equator c and one of tread edges Te in a convex arc shape having a radius of curvature not more than 300 mm. The contour shape J in this embodiment consists of a first arc portion J1 having a radius of curvature R1 with an arc center on the tire equator C and a second arc portion J2 having a radius of curvature R2 and connected with the first arc portion J1 at an intersection P. The radius of curvature R1 is smaller than the radius of curvature R2 and the radius of curvature R2 is less than 300 mm.

In the contour shape 3 configured as such, the radius of curvature R1 of the first arc portion J1 is small. Thereby, transition from straight running to cornering can be made smooth, therefore, it is possible that initial rolling responsiveness is improved. Further, a ground contacting width during straight running becomes small, therefore, it is less susceptible to disturbance from a road surface, thereby, excellent straight running stability is obtained. Furthermore, the radius of curvature R2 of the second arc portion J2 is large, therefore, the ground contacting width increases during the transition from straight running to cornering and during cornering, thereby, it is possible that the steering stability is improved. From this point of view, the radius of curvature R1 is preferably not more than 150 mm, more preferably not more than 120 mm. Note that if the radius of curvature R1 is too small, the ground contacting width becomes too small, which is disadvantageous for the straight running stability. Thereby, it is preferred that a lower limit of the radius of curvature R1 is not less than 60 mm. Note that a ratio R2/R1 of the radii of curvature R1 and R2 is preferably not less than 1.1, more preferably not less than 1.2.

The carcass 6 is formed of at least one (one in this embodiment) carcass ply 6A having carcass cords arranged at an angle in a range of from 75 to 90 degrees, for example, with respect to a tire circumferential direction. As the carcass cords, an organic fiber cords such as nylon, polyester, rayon or the like are suitably used. The carcass ply 6A comprises a ply main body portion 6a extending between the bead cores 5 and ply turned up portions 6b arranged at both ends of the ply main body portion 6a and each turned up around respective one of the bead cores 5 from inside to outside in a tire axial direction. Between the ply main body portion 6a and each of the ply turned up portions 6b, a bead apex rubber 8 for reinforcing the bead portions is provided and each of the bead apex rubbers 8 extends radially outwardly from respective one of the bead cores 5 in a tapered manner.

As the tread reinforcing cord layer 7, a belt layer and/or a band layer can be used. In this embodiment, a case where a band layer 9 is used as the tread reinforcing cord layer 7 is shown. The band layer 9 is formed of at least one (one in this embodiment) band ply having band cords wound in a spiral manner in the tire circumferential direction. As the band cords, high elasticity cords such as steel cords and aramid cords are suitably used.

Note that if the belt layer is used as the tread reinforcing cord layer 7, the belt layer is formed of a plurality of (two, for example) belt plies having belt cords arranged at angles in a range of from 10 to 40 degrees with respect to the tire circumferential direction. The belt plies are overlapped with different inclination directions so that the belt cords of each of the belt plies intersect the belt cords of one of the belt plies adjacent thereto. As the belt cords, steel cords are suitably used.

Figure 2:
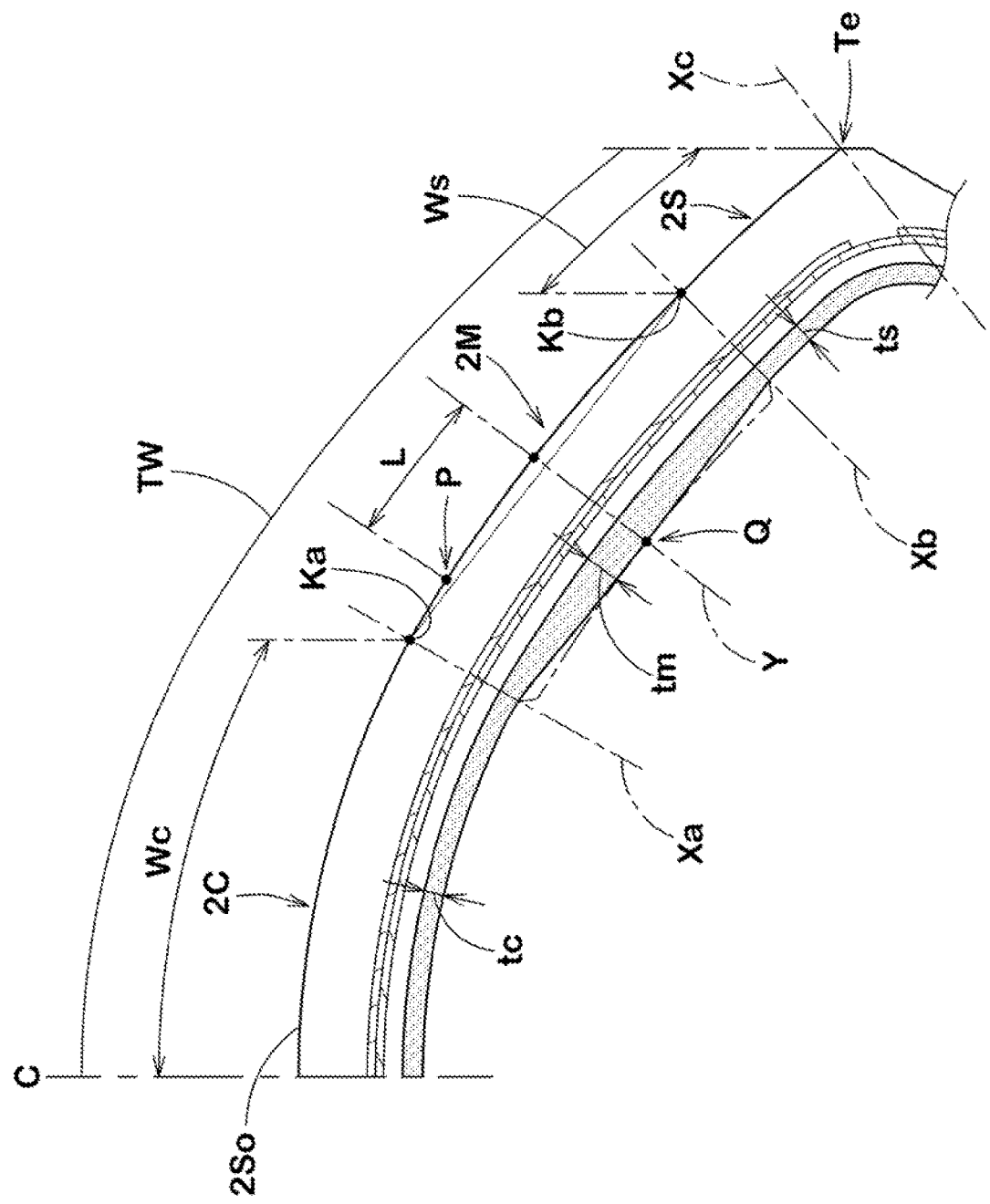
FIG. 2 is a cross-sectional view showing distribution of thickness of a sealant layer.

It is preferred that a developed half width BW of the tread reinforcing cord layer 7 from the tire equator C is in a range of from 0.6 to 0.9 times a tread developed half width TW (shown in FIG. 2). The tread developed half width TW means a width between the tire equator c and one of the tread edges Te along the outer surface 2So. If the developed half width BW is less than 0.6 times the tread developed half width TW, binding force to the tread portion 2 becomes insufficient, and to the contrary, if it is more than 0.9 times, rigidity of shoulder regions 2S becomes too high, which causes the vehicle lean too much during cornering, therefore, in either case, the steering stability is caused to deteriorate.

Further, an inner liner rubber layer 10 is arranged inside the carcass 6. The inner liner rubber layer 10 is made of an air-impermeable rubber such as butyl rubber, and keeps the tire inner pressure air-tight.

Then, a sealant layer 11 for preventing puncture is disposed on an inner surface 2Si of the tread portion 2.

As a sealant material forming the sealant layer 11, materials described in Patent Literature 1 are suitably used. Specifically, the sealant material in this embodiment contains a rubber component, a liquid polymer, a crosslinking agent, and the like. Hardness (viscosity) of the sealant material is controlled by amounts of the rubber component and the crosslinking agent. Further, types and amounts of the liquid polymer, a plasticizer, and carbon black are adjusted to control the rubber component. On the other hand, in order to control the amount of crosslinking, a type and an amount of the crosslinking agent are adjusted.

As the rubber component, butyl-based rubber such as butyl rubber and halogenated butyl rubber is used. Note that as the rubber component, the butyl-based rubber and diene rubber can be used in combination, but from a point of view of flowability or the like, it is preferred that the content of the butyl-based rubber in 100% by mass of the rubber component is not less than 90% by mass.

As the liquid polymer, liquid polybutene, liquid polyisobutene, liquid polyisoprene, liquid polybutadiene, liquid poly α-olefin, liquid isobutylene, liquid ethylene α-olefin copolymer, liquid ethylene propylene copolymer, liquid ethylene butylene copolymer and the like are used. Among them, liquid polybutene is preferred from a point of view of providing tackiness and the like.

The content of the liquid polymer is preferably not less than 50 parts by mass, more preferably not less than 100 parts by mass, with respect to 100 parts by mass of the rubber component. If it is less than 50 parts by mass, it is possible that the tackiness is decreased. The upper limit of the content is preferably not more than 400 parts by mass, more preferably not more than 300 parts by mass. If it is more than 400 parts by mass, it is possible that the sealant material flows during running.

Well-known compounds can be used as the crosslinking agent, but organic peroxides are preferred. In the organic peroxide crosslinking system, the tackiness, sealing property, the flowability and processability are improved by using butyl-based rubber or liquid polymer.

Examples of the organic peroxide are acyl peroxides such as benzoyl peroxide, dibenzoyl peroxide, and p-chlorobenzoyl peroxide, peroxy esters such as 1-butyl peroxyacetate, t-butyl peroxybenzoate, t-butyl peroxy phthalate, ketone peroxides such as methyl ethyl ketone peroxide, alkyl peroxides such as di-t-butyl peroxybenzoate and 1,3-bis (1-butylperoxy isopropyl) benzene, hydroperoxides such as t-butyl hydroperoxide, dicumyl peroxide, t-butyl cumyl peroxide, and the like, for example. Among them, from a point of view of the tackiness and the flowability, acyl peroxides are preferred and dibenzoyl peroxide is particularly preferred.

The content of the organic peroxide (the crosslinking agent) is preferably not less than 0.5 parts by mass, more preferably not less than 1.0 part by mass, with respect to 100 parts by mass of the rubber component. If the amount is less than 0.5 parts by mass, crosslinking density becomes low, therefore, it is possible that the sealant material flows. The upper limit of the content is preferably not more than 40 parts by mass, more preferably not more than 20 parts by mass. If the amount is more than 40 parts by mass, the crosslinking density becomes high, therefore, it is possible that the sealing property is deteriorated.

To the sealant material, a crosslinking aid (vulcanization accelerator), an inorganic filler, a plasticizer and the like can be appropriately added.

The sealant layer 11 is formed by applying the sealant material prepared by adjusting and mixing the above-mentioned materials onto the inner surface 2Si of the tread portion 2. Preferably, as described in Patent Literature 1, for example, it is formed by applying the sealant material continuously extruded from a twin-screw kneading extruder in a spiral manner onto the inner surface 2Si of the tread portion 2 of the rotating tire 1.

As shown in FIG. 2, when the tread portion 2 is virtually divided into a center region 2C on a side of the tire equator C, the shoulder regions 2S on a side of each of the tread edges Te, and middle regions 2M between the center region 2C and each of the shoulder regions 2S, a thickness tm of the sealant layer 11 in the middle regions 2M is set to be larger than a thickness tc of the sealant layer 11 in the center region 2C.

In each half of the cross-sectional view of the tire 1, the center region 2C has a width we from the tire equator c along the outer surface 2So in a range of from 35% to 45% of the tread developed half width TW. More specifically, when a point on the outer surface 2So away from the tire equator c by a distance equal to the width we along the outer surface 2So is referred to as a point Ka, a region range of the tread portion 2 sandwiched between the tire equator c and a reference line Xa passing through the point Ka perpendicularly to the outer surface 2So is the center region 2C.

In each half of the cross-sectional view of the tire 1, the shoulder region 2S has a width Ws from one of the tread edges Te along the outer surface 2So in a range of from 15% to 25% of the tread developed half width TW. More specifically, when a point on the outer surface 2So away from one of the tread edges Te by a distance equal to the width Ws along the outer surface 2So is referred to as a point Kb, a region range of the tread portion 2 sandwiched between a reference line Xb passing through the point Kb perpendicularly to the outer surface 2So and a reference line Xc passing through the tread edge Te perpendicularly to the outer surface 2So is the shoulder region 2S. Further, a region range of the tread portion 2 sandwiched between the reference lines Xa and Xb is the middle region 2M.

In a motorcycle, during running at high speed, the vehicle runs without the vehicle body being tilted very much, therefore, the center region 2C mainly contacts the ground. Thereby, in the center region 2C, it is required to ensure stability during running at high speed by increasing a ground contacting area thereof along with decreasing the rigidity thereof compared to the other regions 2M and 2S to make it difficult to pick up the disturbances from a road surface.

On the other hand, the middle regions 2M contact with the ground during cornering, at the time of acceleration after cornering, and the like, therefore, a heavy load is applied to the middle regions 2M. Thereby, it is required to ensure high cornering performance by increasing the rigidity of the middle regions 2M to suppress too much lean of the vehicle during cornering. Note that the shoulder regions 2S is areas which contact with the ground during cornering at a low speed, therefore, load applied to the shoulder regions 2S is not as large as that applied to the middle regions 2M. Thereby, the shoulder regions 2S are not required to have the rigidity as high as that of the middle regions 2M.

Therefore, in the present invention, at least the thickness tm of the sealant layer 11 in the middle regions 2M is set to be larger than the thickness tc of the sealant layer 11 in the center region 2C.

It is possible that the thickness tm is set to be larger by various methods such as changing the spiral pitch of the sealant material in the middle regions 2M from that in other regions, and applying the sealant material in double layers, for example, in the middle regions 2M when applying the sealant material onto the inner surface 2Si in a spiral manner.

Here, a weight of the tread portion 2 is increased by providing the sealant layer 11. In a portion where the weight is increased, centrifugal force during running becomes large, therefore, tension is increased at a tread face, thereby, the rigidity becomes large.

Accordingly, when the total weight of the sealant layer 11 is the same, by setting the thickness tm larger than the thickness tc, it is possible that the rigidity of the center region 2C is relatively decreased and the rigidity of the middle regions 2M is relatively increased as compared with a case where the thickness of the sealant layer 11 is uniform. By relatively decreasing the rigidity of the center region 2C, it is difficult to pick up the disturbance from a road surface, and the ground contacting area is increased, therefore, it is possible that the stability during running at high speed is improved. Further, by relatively increasing the rigidity of the middle regions 2M, it is possible that the cornering performance is improved by suppressing too much lean of the vehicle during cornering.

Note that a thickness ts of the sealant layer 11 in the shoulder regions 2S is smaller than the thickness tm, and preferably equal to or larger than the thickness tc.

From a point of view of preventing puncture, it is preferred that the thickness tc is constant over the entire center region 2C and the thickness ts is constant over the entire shoulder regions 2S.

On the other hand, each of the middle regions 2M in this embodiment has a maximum thickness position Q at which the thickness tm is the maximum, and the thickness tm gradually decreases from the maximum thickness position Q toward both sides in the tire axial direction. Thereby, it is possible to smoothly increase the rigidity of the middle regions 2M, therefore, it is possible that the transition from straight running to cornering made smooth. In a case where the thickness tm varies, a minimum value of the thickness tm is larger than the thickness tc. As indicated by a one-dot chain line in FIG. 2, it is also possible that the thickness tm of the sealant layer 11 is constant in substantially the entire region of the middle regions 2M.

It is preferred that the thickness tm is smaller than 2.0 times a total average thickness T0 (not shown) obtained by averaging the entire thickness of the sealant layer 11, that is, a thickness obtained by uniformly leveling the entire sealant layer 11. Note that when the thickness tm varies, it is preferred that an average thickness tm0 obtained by averaging the thickness tm is smaller than 2.0 times the total average thickness T0. If the thickness tm (or the average thickness tm0 when the thickness tm varies) is more than 2.0 times the total average thickness T0, the rigidity of the middle regions 2M is increased too much, therefore, the initial rolling responsiveness is decreased. Further, the vehicle tends to lean too much when it comes close to full bank. From such a point of view, it is more preferred that the lower limit value of the thickness tm (or the average thickness tm0) is not less than 1.3 times the total average thickness T0 and the upper limit is not more than 1.5 times.

Furthermore, it is preferred that a distance L along the outer surface 2So between the intersection P and a reference line Y passing through the arc center (not shown) of the second arc portion J2 and the maximum thickness position Q is not more than 25% of the tread developed half width TW. Note that the intersection P is located on a side of the tire equator C of the reference line Y. If the distance L is more than 25% of the tread developed half width TW, it becomes difficult to roll and the vehicle tends to lean too much when it comes close to full bank. From this point of view, it is more preferred that the distance L is not more than 20% of the tread developed half width TW.

Note that when the maximum thickness position Q has a width in the tire axial direction, a straight line passing through a center of the width and the arc center of the second arc portion J2 is defined as the reference line Y.

While detailed description has been made of the tire for a motorcycle as an especially preferred embodiment of the present invention, the present invention can be embodied in various forms without being limited to the illustrated embodiment.

Working Example (Example)

Tires for a motorcycle of size 180/55ZR17 having the structure shown in FIG. 1 were made by way of test according to the specifications listed in Table 1. Then the test tires were tested for the steering stability and the air sealing property and compared. Except as shown in Table 1, the test tires have substantially the same specification.
(1) Steering Stability Each of the test tires was mounted on a rear wheel of a large-sized motorcycle with a displacement of 750 cc under the following conditions, and then the motorcycle was driven on a tire test course. And the change of the steering stability while increasing the lean of the motorcycle body and transient characteristics when the motorcycle body is tilted from a steady state were evaluated by the driver's feeling evaluation by the 5 point method, wherein a larger numerical value is better. Note that a commercially available tire of size 120/70ZR20 was mounted on a front wheel of the test motorcycle.

Front wheel: Rim (MT3.50), Tire inner pressure (250 kPa)
Rear wheel: Rim (MT3.50), Tire inner pressure (290 kPa)
(2) Air Sealing Property The test motorcycle was driven on a road with nails (2.5 mm in diameter, 44 mm in length) scattered thereon at a speed of 60 km/h. At the time when ten nails were stuck in the rear wheel, the test tire was dismounted, and then the tire inner pressure was measured after the nails were removed. The results are indicated by a ratio (%) of the measured tire inner pressure and an initial tire inner pressure (290 kPa), wherein a larger numerical value is better.

to the sealant layer or can improve the steering stability while exerting the air sealing property by the sealant layer.

A composition of the sealant material used for the sealant layer is shown in Table 2. Chemicals shown in Table 2 are as follows.

Butyl rubber: IIR 065 available from JSR Corporation
Polybutene: HV-1900 available from JXTG Nippon oil and Energy Corporation, number average molecular weight: 2900
Carbon black: N330 available from cabot Japan Co., Ltd.
Oil: DOS (dioctyl sebacate) available from Taoka chemical Co., Ltd.
Crosslinking agent: Nyper NS (BPO 40%, DBP 48%) available from NOF corporation.
Crosslinking aid: QO (quinone dioxime) available from Ouchi Shinko chemical Industrial Co., Ltd.

TABLE 2

| <Sealant material> | Composition (parts by mass) |
|---|---|
| Butyl rubber | 100 |
| Polybutene | 200 |
| carbon black | 15 |
| Oil | 15 |
| Crosslinking agent | 7 |
| Crosslinking aid | 7 |

The invention claimed is:
1. A tire for a motorcycle comprising:
a tread portion comprising an outer surface having a convex arc contour shape having a radius of curvature not more than 300 mm,
sidewall portions,
bead cores of bead portions,
a carcass extending between the bead cores of the bead portions through the sidewall portions and the tread portion, and
an inner liner rubber layer being arranged inside the carcass and made of an air-impermeable rubber, wherein
the tread portion is provided on an inner surface of the inner liner with a sealant layer for preventing puncture, and

TABLE 1

| | Ref. 1 | Ref. 2 | Ex. 1 | Ex. 2 | Ref. 3 | Ex. 3 | Ex. 4 |
|---|---|---|---|---|---|---|---|
| <Sealant layer> | Absence | | | Presence | | | |
| Thickness tc/ Total average thickness T0 | — | 1 | 0.8 | 0.5 | 1.2 | 0.8 | 0.8 |
| Thickness tm/ Total average thickness T0 | — | 1 | 1.5 | 2.2 | 0.5 | 1.5 | 1.5 |
| Thickness ts/ Total average thickness T0 | — | 1 | 0.8 | 0.5 | 1.2 | 0.8 | 0.8 |
| Contour shape of Tread portion | | | | | | | |
| Radius of curvature R1 | 90 | 90 | 90 | 90 | 90 | 160 | 160 |
| Radius of curvature R2 | 190 | 190 | 190 | 190 | 190 | 250 | 160 |
| <Tread reinforcing cord layer> | | | | | | | |
| Developed half width BW/ Tread developed half width TW | 0.85 | 0.85 | 0.85 | 0.85 | 0.85 | 0.85 | 0.85 |
| Steering Stability | 4 | 2 | 5 | 3.2 | 2.5 | 3.5 | 3.2 |
| Air sealing property | 0 | 80 | 80 | 90 | 40 | 70 | 70 |

As shown in Table 1, it can be confirmed that the tires as Examples can suppress decrease of the steering stability due in each half of a cross-sectional view of the tire for a motorcycle, when the tread portion is virtually divided into a center region having a width Wc from a tire equator along the outer surface in a range of 35% to 45% of a tread developed half width TW between the tire equator and a tread edge, a shoulder region having a width Ws from the tread edge along the outer surface in a range of 15% to 25% of the tread developed half width TW, and a middle region between the center region and the shoulder region, the sealant layer extends at least from one of the shoulder regions to the other one of the shoulder regions continuously without terminating such that a thickness tm of the sealant layer in each middle region is larger than a thickness tc of the sealant layer in the center region.

2. The tire for a motorcycle according to claim 1, wherein the thickness tm is smaller than 2.0 times a total average thickness T0 obtained by averaging an entire thickness of the sealant layer.

3. The tire for a motorcycle according to claim 1, wherein in each half of the cross-sectional view of the tire for a motorcycle, the contour shape of the tread portion consists of a first arc portion having a radius of curvature R1 with an arc center thereof on the tire equator and a second arc portion having a radius of curvature R2 and connected with the first arc portion at an intersection P, and the radius of curvature R1 is smaller than the radius of curvature R2.

4. The tire for a motorcycle according to claim 3, wherein the radius of curvature R1 is not more than 150 mm.

5. The tire for a motorcycle according to claim 1, wherein the tread portion has a tread reinforcing cord layer disposed thereinside, and a developed half width BW of the tread reinforcing cord layer from the tire equator is in a range of from 0.6 to 0.9 times the tread developed half width TW.

6. The tire for a motorcycle according to claim 1, wherein a thickness ts of the sealant layer in the shoulder regions is smaller than the thickness tm of the sealant layer in the middle regions.

7. The tire for a motorcycle according to claim 1, wherein a thickness ts of the sealant layer in the shoulder regions is equal to the thickness tc of the sealant layer in the center region.

8. The tire for a motorcycle according to claim 1, wherein a thickness ts of the sealant layer in the shoulder regions is greater than the thickness tc of the sealant layer in the center region.

9. The tire for a motorcycle according to claim 1, wherein each of the middle regions has a maximum thickness position Q at which the thickness tm is the maximum, and the thickness tm decreases continuously from the maximum thickness position Q toward both sides in the tire axial direction.

10. The tire for a motorcycle according to claim 2, wherein a thickness ratio tc/T0 of the thickness tc of the sealant layer in the center region to the total average thickness T0 is in a range from 0.5 to 0.8, and a thickness ratio ts/T0 of a thickness ts of the sealant layer in the shoulder regions to the total average thickness T0 is in a range from 0.5 to 0.8.

11. The tire for a motorcycle according to claim 3, wherein the radius of curvature R1 is equal to or more than 60 mm.

12. The tire for a motorcycle according to claim 1, wherein the sealant layer is exposed at a tire inner cavity.

* * * * *